US006967286B2

(12) United States Patent
Daito

(10) Patent No.: US 6,967,286 B2
(45) Date of Patent: Nov. 22, 2005

(54) LOCK STRUCTURE

(75) Inventor: Koji Daito, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/992,641

(22) Filed: Nov. 22, 2004

(65) Prior Publication Data

US 2005/0136749 A1 Jun. 23, 2005

(30) Foreign Application Priority Data

Dec. 1, 2003 (JP) .......................... P2003-401738

(51) Int. Cl.[7] .............................................. H02G 3/04
(52) U.S. Cl. .................. 174/68.3; 174/68.1; 174/72 A; 174/135; 138/162; 296/152
(58) Field of Search ...................... 174/48, 68.1, 68.3, 174/70 C, 71 R, 72 A, 95, 97, 98, 99 R, 174/100, 101, 135; 138/157, 162, 167; 248/49, 248/68.1, 74.1, 74.2, 74.4; 296/152; 292/256, 292/256.63

(56) References Cited

U.S. PATENT DOCUMENTS

| | | | | |
|---|---|---|---|---|
| 4,864,082 | A | * | 9/1989 | Ono et al. ..................... 174/97 |
| 4,951,716 | A | * | 8/1990 | Tsunoda et al. ............. 138/162 |
| 5,597,980 | A | * | 1/1997 | Weber ....................... 174/72 A |
| 5,716,044 | A | * | 2/1998 | Peterson et al. ............. 296/152 |
| 6,049,040 | A | * | 4/2000 | Biles et al. ................ 174/68.3 |
| 6,126,123 | A | * | 10/2000 | Yang ......................... 248/74.1 |
| 6,229,091 | B1 | * | 5/2001 | Ogawa et al. ............. 174/72 A |
| 6,462,276 | B2 | * | 10/2002 | Shimizu et al. ........... 174/65 R |
| 6,830,225 | B2 | * | 12/2004 | Kato ............................ 248/49 |
| 6,861,589 | B2 | * | 3/2005 | Katsumata et al. ........ 174/68.3 |
| 6,878,879 | B2 | * | 4/2005 | Takahashi et al. ........ 174/72 A |

FOREIGN PATENT DOCUMENTS

JP          5-344627 A     12/1993

* cited by examiner

Primary Examiner—Dean A. Reichard
Assistant Examiner—Adolfo Nino
(74) Attorney, Agent, or Firm—Sughrue Mion, PLLC

(57) ABSTRACT

An electrical wire bundle W is accommodated in a main body 20 of a protector 10, a cover portion 30 is closed, and the main body 20 and the cover portion 30 are locked by lock portions 40 capable of engaging the two members. Namely, if a belt-shaped retaining piece 31 extending from the cover portion 30 toward the main body 20 is inserted into a retaining hole 25 of a through hole 23 provided through an attaching portion 21 of the main body 20, a pawl portion 32 of the retaining piece 31 rides over a flexible piece 24, which is provided between the retaining hole 25 and a flexible hole 26, while deflecting the flexible piece 24, so as to be retained by the flexible piece 24. Since a widthwise dimension of the flexible hole 26 is less than a maximum widthwise dimension of the retaining piece 31, when the retaining piece 31 is inserted in the retaining hole 25, even if an attempt is erroneously made to insert the retaining piece 31 into the flexible hole26 the retaining piece 31 cannot be inserted. Therefore, it is possible to know that an inserting position is erroneous. Further, since the flexible hole 26 is present on an outer side of the retaining hole 26, it is possible to prevent the retaining piece 31 from slipping down to the outer side.

2 Claims, 6 Drawing Sheets

LOCK STRUCTURE

BACKGROUND OF THE INVENTION

1. Technical Field

The present invention relates to a lock structure, and more particularly to a lock structure suitable for attaching a cover portion making up, for instance, a protector to a main body.

2. Related Art

A lock structure of a protector, such as the one shown in FIG. 6, is conventionally known in Unexamined Japanese Patent Publication H05-344627.

As shown in FIG. 6, a lock structure 110 of this protector 100, which is attached to an electrical wire bundle W, has a retaining hole 111 provided in a main body 101 as well as a retaining arm 112 which is provided in a cover 102 for closing an opening of the main body 101 and is inserted in the retaining hole 111.

As shown in FIG. 7, the retaining arm 112 is provided with a retaining projection 113 which is inserted in the retaining hole 111 and is retained by a peripheral edge of the retaining hole 111 on a farther side in the inserting direction. Slip-down preventing walls 114 and 115 for preventing the slipping down of the retaining arm 112 are respectively provided on an opening-side peripheral portion of the retaining hole 111 and a main body inner wall 103 on the opening side of the retaining hole 111.

Incidentally, if the above-described slip-down preventing wall 114 for preventing the slipping down of the retaining arm 112 to the outer side is provided on the outer side of a retaining frame 116 for retaining frame 116 so as to retain the retaining projection 113 of the retaining arm 112 inserted in the retaining hole 111, the rigidity of the retaining frame 116 becomes high, and the retaining frame 116 becomes difficult to be deformed.

For this reason, there has been a drawback in that when the retaining arm 112 is inserted in the retaining hole 111, and the retaining projection 113 is passed through the retaining frame 116, the retaining frame 116 is difficult to undergo deformation, making it difficult for the retaining arm 112 to be inserted in the retaining hole 111.

SUMMARY OF THE INVENTION

The invention has been devised in view of the above-described problem, and its object is to provide a lock structure which makes it possible to easily insert and retain the retaining piece in the retaining hole, and prevent the retaining piece from slipping down to the outer side of the retaining hole.

To attain the above object, in accordance with one aspect of the invention there is provided a lock structure comprising: a main body and a cover portion for forming a tubular body by being combined to each other; an attaching portion provided on the main body to attach the tubular body to a vehicle body; and a lock portion which is provided at a position where the attaching portion is disposed and which is capable of mutually engaging the main body and the cover portion, the lock portion having a belt-shaped retaining piece extending from the cover portion toward the main body, a through hole provided through the attaching potion along an inserting direction of the retaining piece, and a retaining hole and a flexible hole provided so as to partition the through hole by a plate-like flexible piece traversing the through hole, the retaining piece having a pawl portion, which as the retaining piece is inserted into the retaining hole, is adapted to ride over the flexible piece while deflecting the flexible piece toward a flexible hole side, so as to be retained by the flexible piece, wherein a widthwise dimension of the flexible hole is less than a maximum widthwise dimension of the retaining piece.

In the lock structure thus constructed, an electrical wire bundle or the like is accommodated in the main body, the cover portion is closed and the main body and the cover portion are locked by the lock portions capable of engaging the two members. Namely, if the belt-shaped retaining piece extending from the cover portion toward the main body is inserted into the retaining hole of the through hole provided through the attaching portion of the main body, the pawl portion of the retaining piece rides over the flexible piece, which is provided between the retaining hole and the flexible hole, while deflecting the flexible piece, so as to be retained by the flexible piece, thereby providing a lock. Since the widthwise dimension of the flexible hole is less than the maximum widthwise dimension of the retaining piece, when the retaining piece is inserted in the retaining hole, even if an attempt is erroneously made to insert the retaining piece into the flexible hole, the retaining piece cannot be inserted. Therefore, it is possible to know that the inserting position is erroneous. Further, since the flexible hole is present on the outer side of the retaining hole, it is possible to prevent the retaining piece from slipping down to the outer side.

Furthermore, the lock structure in accordance with the invention is characterized in that the retaining piece has a projection projecting in a widthwise direction from a widthwise edge of the retaining piece, and the retaining piece is insertable in the retaining hole and uninsertable in the flexible hole by means of the projection.

In the lock structure thus constructed, since the projection is formed in such a manner as to project from a widthwise edge of the retaining piece outwardly in the widthwise direction, so that the retaining piece is insertable in the retaining hole but uninsertable in the flexible hole. Therefore, when the retaining piece is inserted in the retaining hole, even if an attempt is erroneously made to insert the retaining piece into the flexible hole, the retaining piece cannot be inserted. Thus, it is possible to know that the inserting position is erroneous. Further, since the flexible hole is present on the outer side of the retaining hole, it is possible to prevent the retaining piece from slipping down to the outer side.

In addition, in accordance with another aspect of the invention there is provided a lock structure comprising: a main body and a cover portion for forming a tubular body by being combined to each other; an attaching portion provided on the main body to attach the tubular body to a vehicle body; and a lock portion which is provided at a position where the attaching portion is disposed and which is capable of mutually engaging the main body and the cover portion, the lock portion having a belt-shaped retaining piece extending from the cover portion toward the main body, a through hole provided through the attaching potion along an inserting direction of the retaining piece, and a retaining hole and a flexible hole provided so as to partition the through hole by a plate-like flexible piece traversing the through hole, the retaining piece having a pawl portion, which as the retaining piece is inserted into the retaining hole is adapted to ride over the flexible piece while deflecting the flexible piece toward a flexible hole side, so as to be retained by the flexible piece, wherein a thicknesswise dimension of the flexible hole exceeds a maximum thicknesswise dimension of the retaining piece including the pawl portion.

In the lock structure thus constructed, an electrical wire bundle or the like is accommodated in the main body, the cover portion is closed, and the main body and the cover portion are locked by the lock portions capable of engaging the two members. Namely, if the belt-shaped retaining piece extending from the cover portion toward the main body is inserted into the retaining hole of the through hole provided through the attaching portion of the main body, the pawl portion of the retaining piece rides over the flexible piece, which is provided between the retaining hole and the flexible hole, while deflecting the flexible piece, so as to be retained by the flexible piece, thereby providing a lock. Since the thicknesswise dimension of the flexible hole is greater than the maximum thicknesswise dimension of the retaining piece including the pawl portion, when the retaining piece is inserted in the retaining hole, even if an attempt is erroneously made to insert the retaining piece into the flexible hole, the pawl portion cannot be inserted. Therefore, it is possible to know that the inserting position is erroneous. Further, since the flexible hole is present on the outer side of the retaining hole, it is possible to prevent the retaining piece from slipping down to the outer side.

According to the invention, it is possible to prevent the retaining piece from slipping down to the outer side of the retaining hole and reliably insert and retain the retaining piece in the retaining hole.

DETAILED DESCRIPTION OF THE PREFERRED EMBODIMENTS

Figure 1:
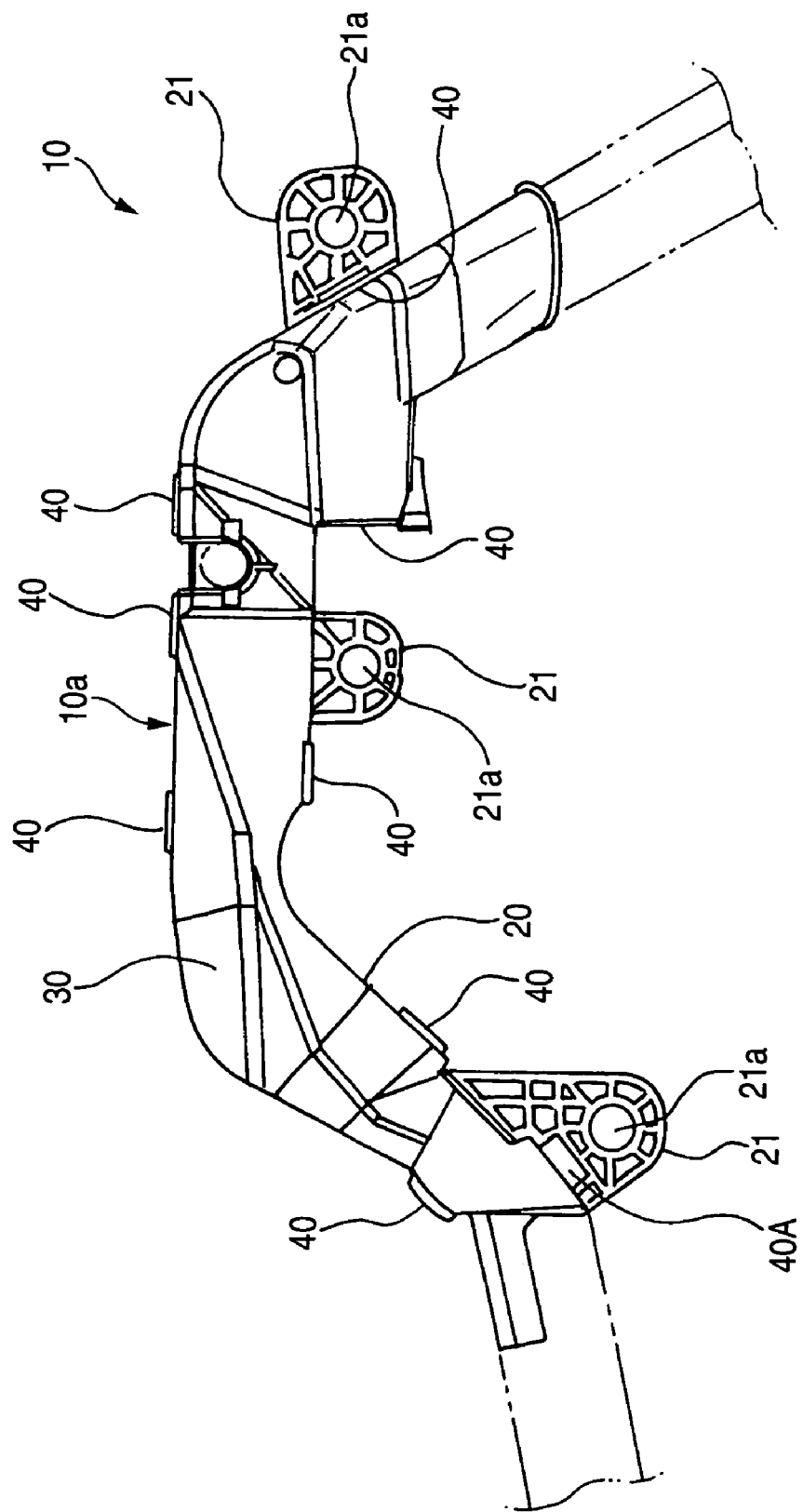
FIG. 1 is a perspective view illustrating a first embodiment of a lock structure in accordance with the invention.
Figure 2:
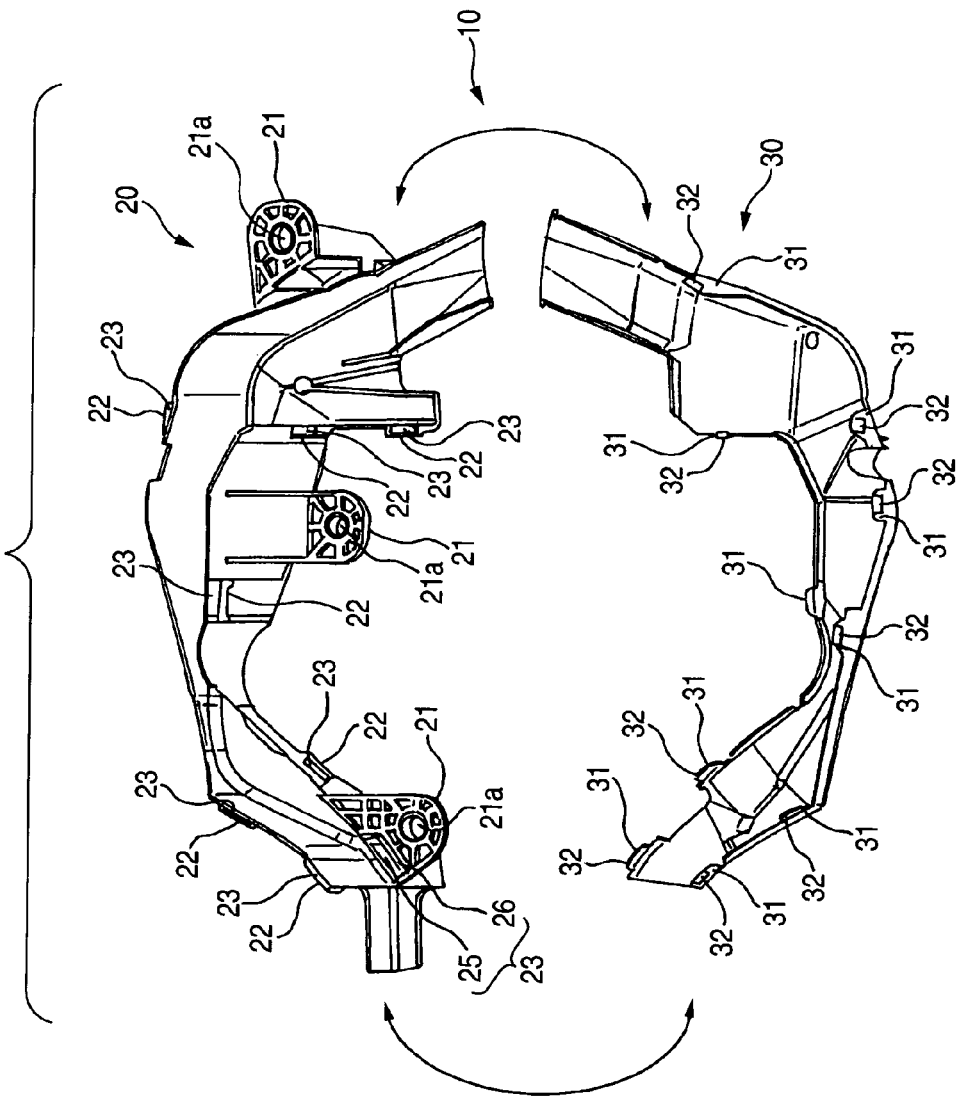
FIG. 2 is a perspective view illustrating inner surfaces of a main body and a cover portion by developing a protector.
Figure 3:
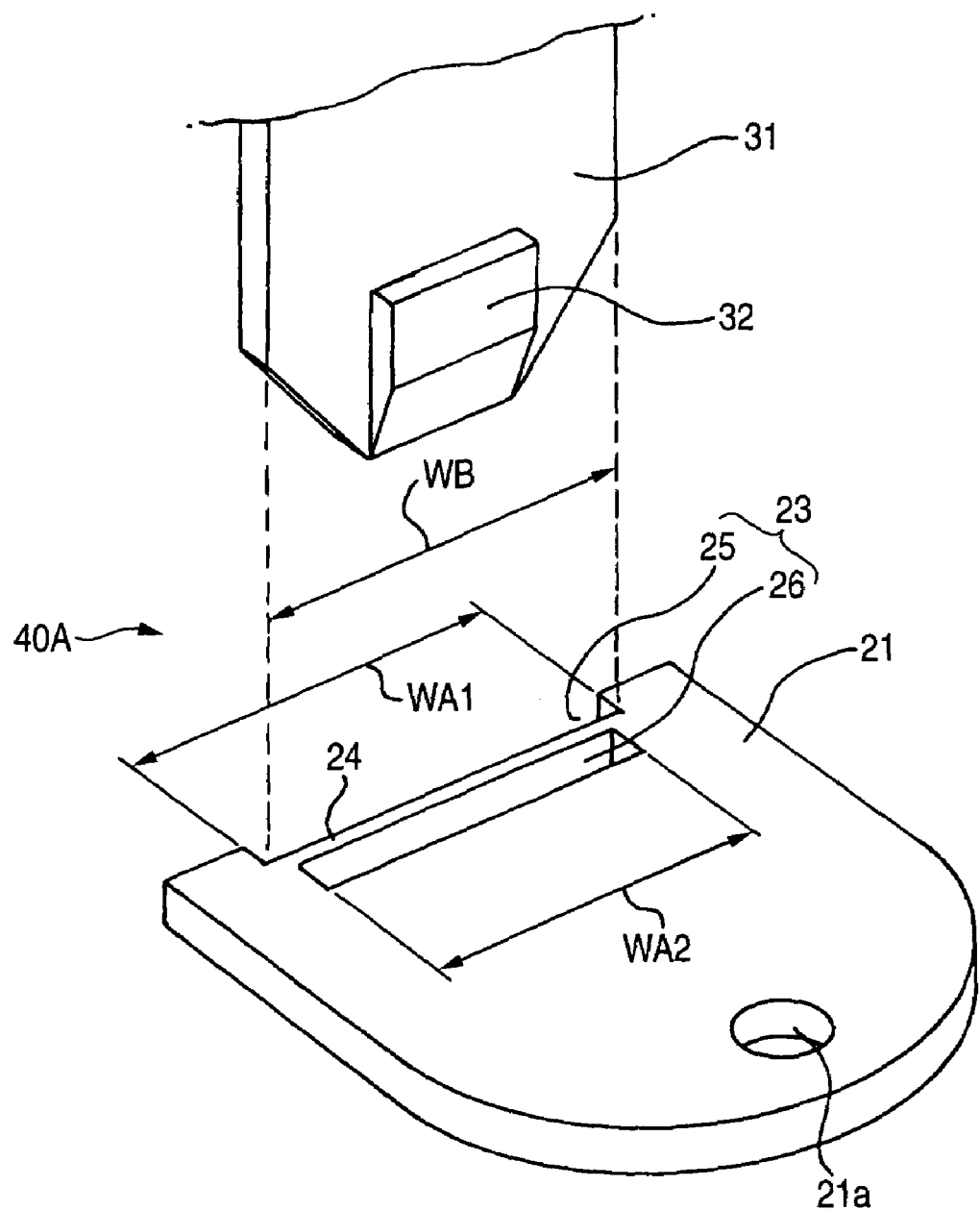
FIG. 3 is an explanatory diagram illustrating widths of a retaining piece and an attaching portion in a lock portion.

Hereafter, a detailed description will be given of the embodiments of the invention with reference to the drawings. FIG. 1 is a perspective view illustrating a first embodiment of the lock structure in accordance with the invention. FIG. 2 is a perspective view illustrating inner surfaces of a main body and a cover portion by developing a protector. FIG. 3 is an explanatory diagram illustrating widths of a retaining piece and an attaching portion in a lock portion.

As shown in FIG. 1, a protector 10, to which the lock structure in accordance with the first embodiment of the invention is applied, has a substantially U-shaped main body 20 for forming a tubular body 10a which, through mutual combination, is capable of accommodating an electrical wire bundle W routed in, for instance, an automobile, as well as a cover portion 30 for covering an opening in an upper portion of the main body 20.

The main body 20 and the cover portion 30, while maintaining a space for accommodating the wire bundle W, are three-dimensionally deformed in conformity with the routing path of the wire bundle W which is routed. Attaching portions 21 for attaching the tubular body 10a to a vehicle body (not shown) are provided on the main body 20 in a projecting manner, and attaching holes 21a for attachment are provided therein.

A plurality of lock portions 40 capable of mutually engaging the main body 20 and the cover portion 30 are provided at appropriate positions on the two members 20 and 30.

At the lock portions 40 other than a lock portion 40A located at one attaching portion 21, retaining portions 22 are provided on the main body 20, and through holes 23 are provided in the respective retaining portions 22. Meanwhile, belt-shaped retaining pieces 31, which extend toward the main body 20 and are respectively inserted in the through holes 23 of the retaining portions 22, are provided on the lock portions 40 of the cover portion 30 in correspondence with the retaining portions 22 of the main body 20. A pawl portion 32 is provided on a distal end of each of these retaining pieces 31 in such a manner as to project from an outer surface of the retaining piece 31.

As shown in FIGS. 2 and 3, the through hole 23 in the lock portion 40A located at the attaching portion 21 is partitioned into a retaining hole 25 and a flexible hole 26 by a flexible piece 24 which is a flexible plate-like member extending in the longitudinal direction of the through hole 23. The retaining hole 25 is formed by partitioning on the main body 20 side of the through hole 23, while the flexible hole 26 is formed by partitioning on an outer side thereof.

Namely, when the retaining piece 31 is inserted in the through hole 23 of the attaching portion 21, the retaining piece 31 is inserted in the retaining hole 25 of the through hole 23. When the pawl portion 32 of the retaining piece 31 is passed through the retaining hole 25, the pawl portion 32 is passed while deflecting the flexible piece 24 outwardly. Upon passage of the pawl portion 32 through the retaining hole 25, the flexible piece 24 returns to its original position because of its resiliency, thereby retaining the pawl portion 32 and preventing it from coming off.

As shown in FIG. 3, if it is assumed that the width of the retaining hole 25 of the attaching portion 21 is WA1, the width of the flexible hole is WA2, and the width of the retaining piece 31 is WB, a relation of the form WA1>WB holds for the retaining piece 31 to be insertable in the retaining hole 25.

On the other hand, a relation of the form WA2<WB is set for the retaining piece 31 to be uninsertable in the flexible hole 26.

Namely, the arrangement provided is such that the widthwise dimension WA2 of the flexible hole 26 is less than the maximum widthwise dimension WB of the retaining piece 31.

As described above, according to the above-described lock structure of the protector, the retaining piece 31 can be inserted in the retaining hole 25 forming the through hole 23 of the attaching portion 21, but cannot be inserted in the flexible hole 26 forming the through hole 23. Therefore, even if an attempt is erroneously made to insert the retaining piece 31 on the outer side of the retaining hole 23, the retaining piece 31 can be inserted only midway into the flexible hole 26.

For this reason, it is possible to know that an attempt has been made to insert the retaining piece 31 on the outer side of the retaining hole 23, so that it is possible to prevent the retaining piece 31 from slipping down to the outer side of the retaining hole 23.

Figure 4A:
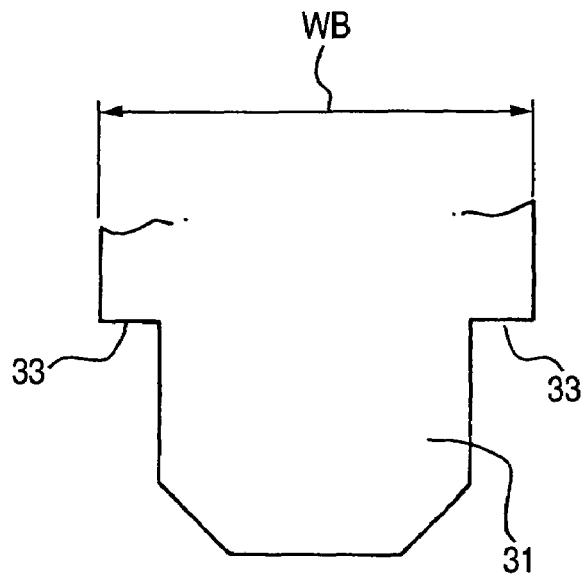
FIGS. 4A and 4B are front elevational views illustrating other shapes of the retaining piece.
Figure 4B:
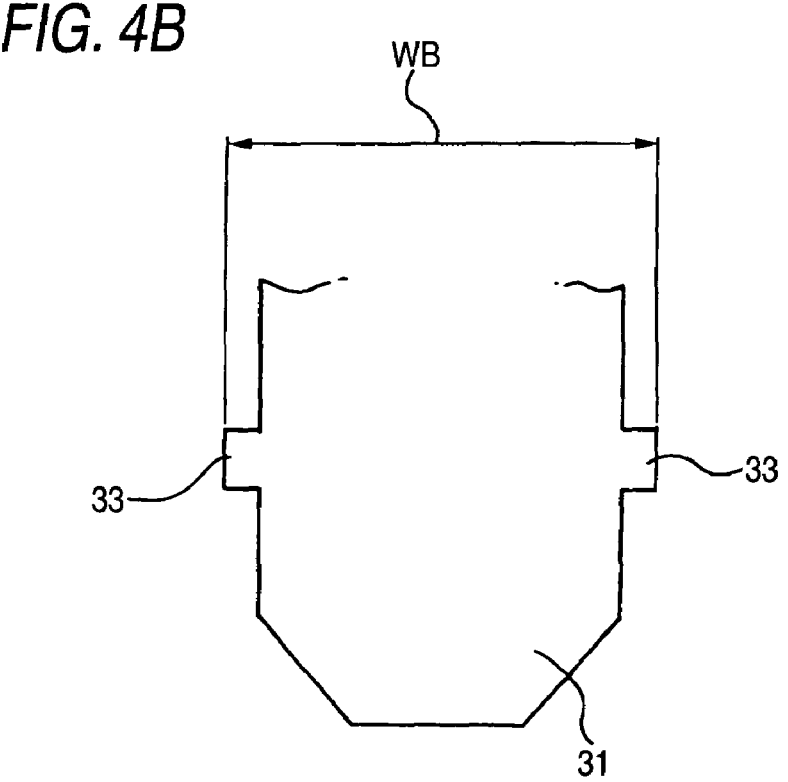

It should be noted that although, as shown in FIG. 3, the widthwise dimension of the retaining piece 24 may be fixed at WB which is a maximum dimension, a pair of projections 33 each projecting in the widthwise direction from a widthwise edge 31a of the retaining piece 31 may be provided, as shown in FIGS. 4A and 4B.

Namely, in FIG. 4A, the projections 33 for forming the maximum width WB are provided by enlarging the width of the retaining piece 31 from midway so as to obtain a fixed width on the proximal end side. It should be noted that although the projections 33 may be respectively provided on both sides at left and right, the projection 33 may be provided on either one side alone.

In addition, although the lock structure of the projector in accordance with the invention is applicable to all the lock portions 40 shown in FIGS. 1 and 2, the lock structure may be applied only to some of the lock portions 40.

Figure 5:
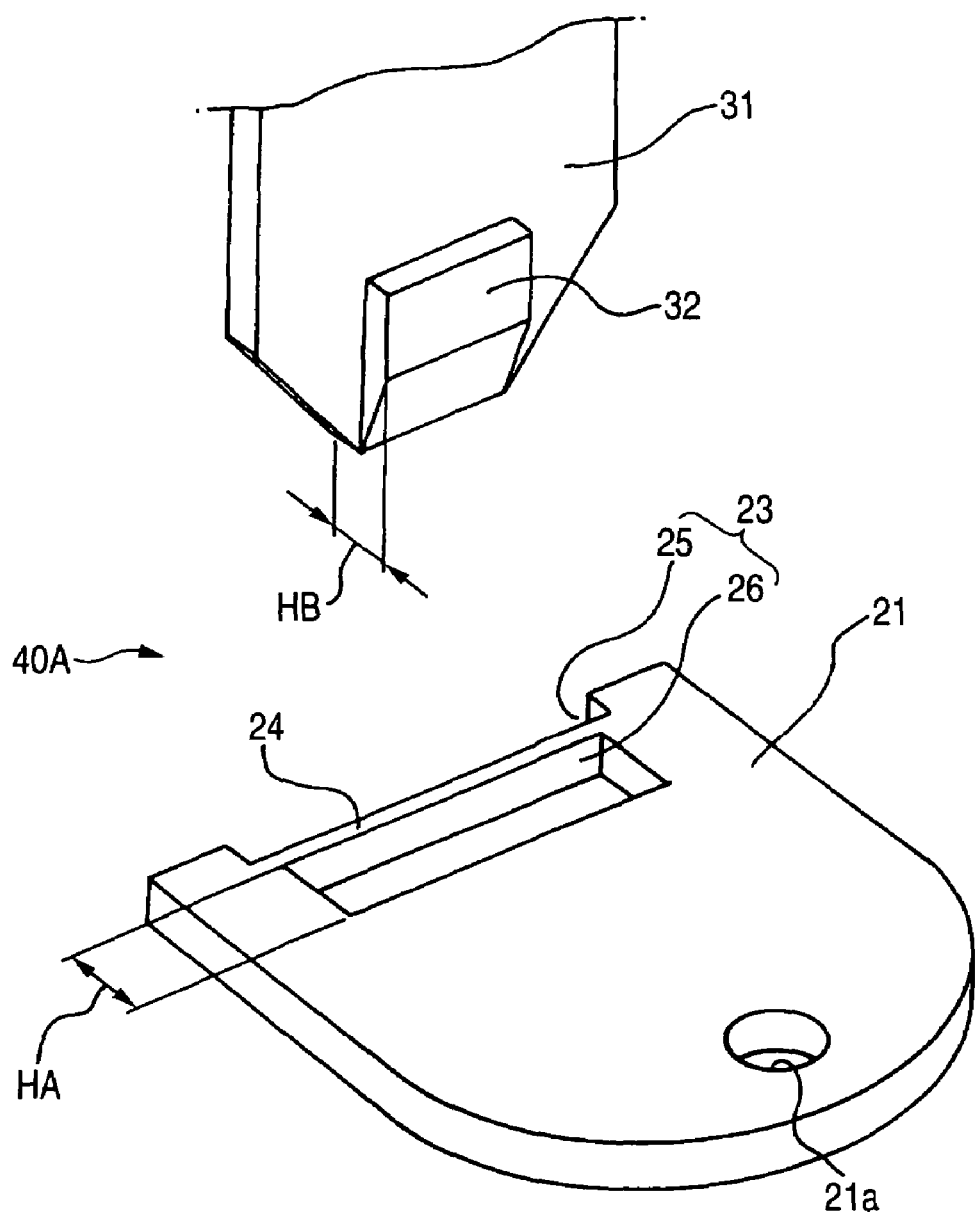
FIG. 5 is a perspective view illustrating essential portions of a second embodiment of the lock structure of the protector in accordance the invention.
Figure 6:
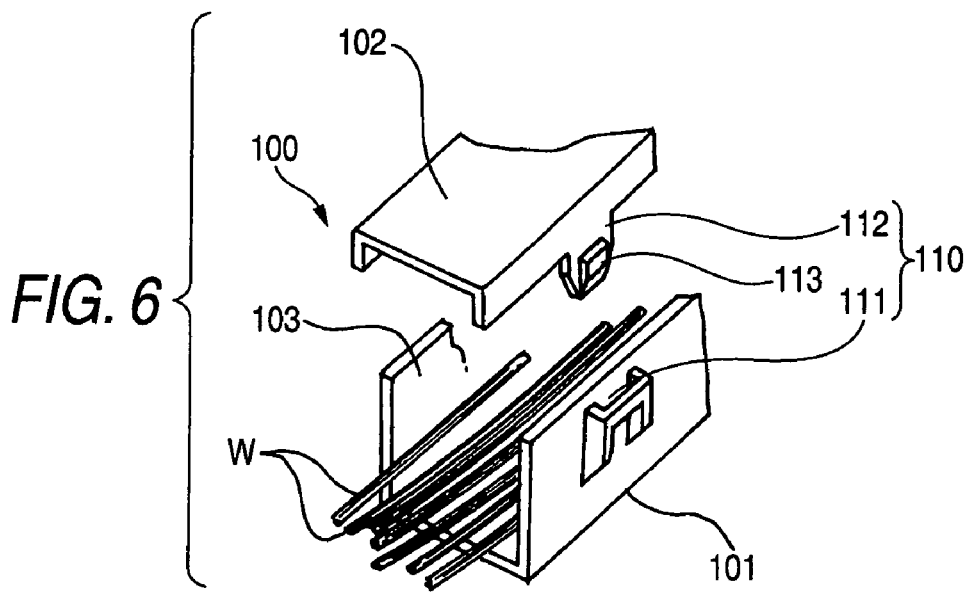
FIG. 6 is a perspective view illustrating a conventional lock structure.
Figure 7:
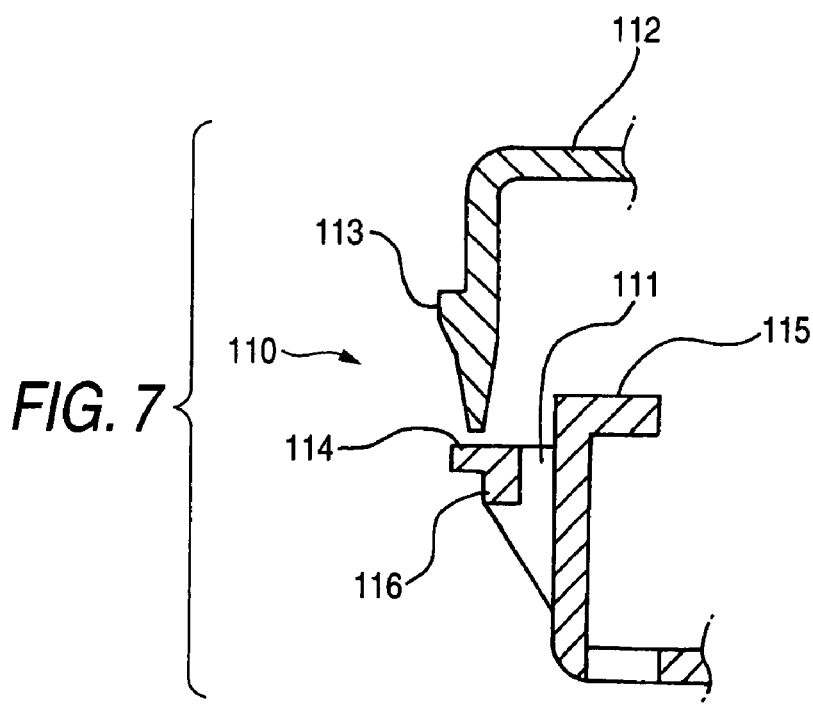
FIG. 7 is a cross-sectional view illustrating the lock structure.

Next, a detailed description will be given of a second embodiment of the lock structure of the protector in accordance with the invention referring to a drawing. FIG. 5 is an explanatory diagram illustrating essential portions of a second embodiment of the lock structure of the protector in accordance the invention.

It should be noted that portions common to those of the above-described first embodiment will be denoted by the same reference numerals, and a redundant description will be omitted.

As shown in FIG. 5, in this lock structure, a thicknesswise dimension HA of the flexible hole 2 for making up the through hole 23 of the attaching portion 21 is set so as to exceed a maximum thicknesswise dimension HB including the pawl portion 32 of the retaining piece 31. As a result, if the retaining piece 31 is erroneously inserted on the outer side of the retaining hole 25, the retaining piece 31 easily slips off the attaching portion 21 without being retained by the flexible hole 26. Hence, it is possible to know that an attempt is erroneously being made to insert the retaining piece 31.

Consequently, it is possible to prevent the retaining piece 31 from slipping down on the outer side of the retaining hole 23.

It should be noted that the lock structure of the invention is not limited to the above-described embodiments, and appropriate modifications, improvements, and the like are possible.

For example, although in the above-described embodiments the lock structure in accordance with the invention is applied only to the lock portion 40A of one attaching portion 21, the lock structure of the invention is applicable to the other attaching portions 21 as well. Furthermore, the shapes of the retaining piece 31a, the attaching portion 21, and the like are not limited to those shown in the above-described embodiments.

In addition, although in the above-described embodiments an example has been shown in which the lock structure is applied to the protector, the lock structure of the invention is applicable to other items other than the protector.

What is claimed is:

1. A lock structure comprising:
   a main body and a cover portion for forming a tubular body by being combined to each other;
   an attaching portion provided on the main body to attach the tubular body to a vehicle body; and
   a lock portion provided at a position where the attaching portion is disposed and which is capable of mutually engaging the main body and the cover portion, the lock portion including:
   a belt-shaped retaining piece extending from the cover portion toward the main body, the belt-shaped retaining piece having a pawl portion,
   a through hole provided through the attaching portion along an inserting direction of the retaining piece, and
   a retaining hole and a flexible hole provided so as to partition the through hole by a plate-like flexible piece traversing the through hole,
   wherein the lock structure is satisfied with at least one condition such as a width of the flexible hole being less than a maximum width of the retaining piece and wherein a thickness of the flexible hole exceeding a maximum thickness of the retaining piece including the pawl portion.

2. The lock structure according to claim 1, wherein the retaining piece has a projection projecting in a width from a widthwise edge of the retaining piece, and the retaining piece is insertable in the retaining hole and uninsertable in the flexible hole by means of the projection.

* * * * *